April 25, 1950 — A. BOYAJIAN — 2,505,521
AGE INDICATING DEVICE FOR ELECTRICAL APPARATUS
Filed March 1, 1944
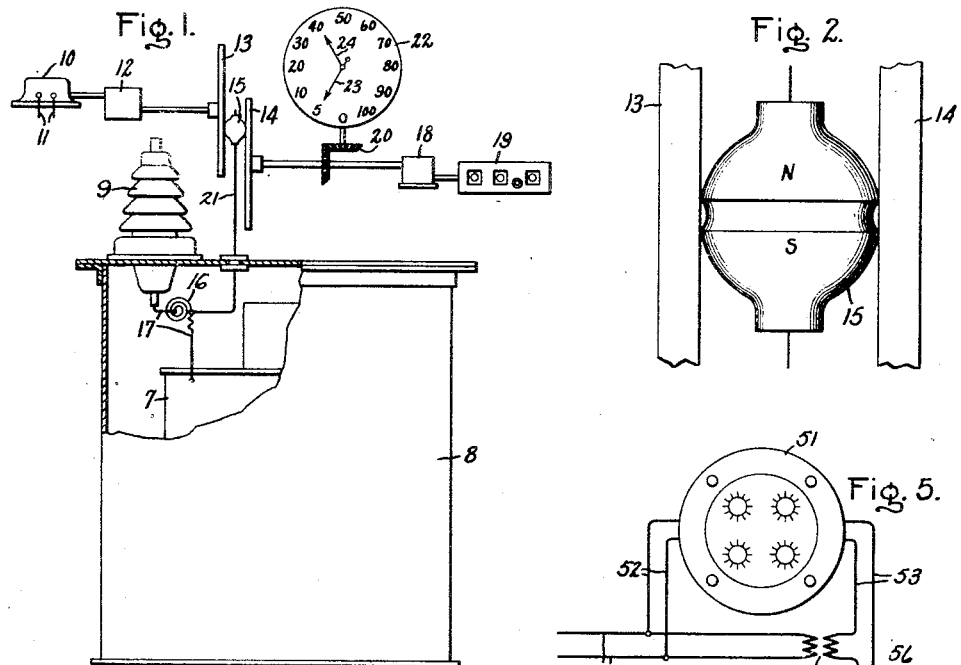
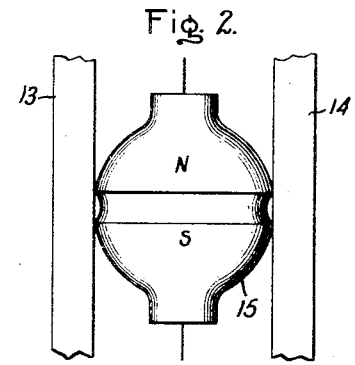
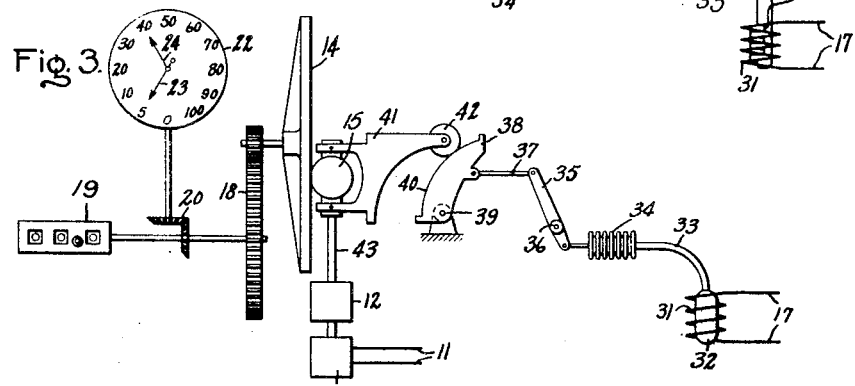
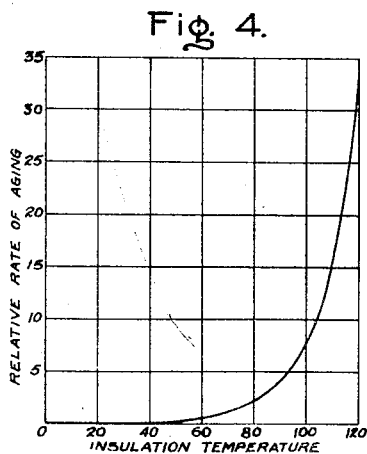
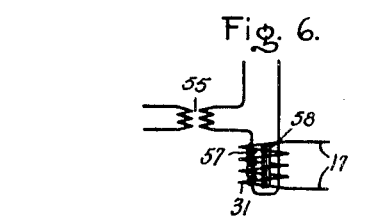
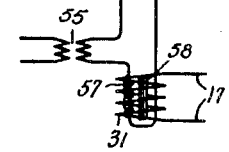
Inventor:
Aram Boyajian,
by Harry E. Dunham
His Attorney.

Patented Apr. 25, 1950

2,505,521

UNITED STATES PATENT OFFICE 2,505,521

AGE INDICATING DEVICE FOR ELECTRICAL APPARATUS

Aram Boyajian, Pittsfield, Mass., assignor to General Electric Company, a corporation of New York Application March 1, 1944, Serial No. 524,643

4 Claims. (Cl. 73—350)

This invention relates to electrical apparatus subject to aging, for instance, transformers, and to an apparatus for giving an indication of such aging, and has for its general objects the construction of such apparatus with means to yield an indication of the extent of their aging and their operation based on such indication.

It is generally recognized that an apparatus that has aged should not be as heavily loaded as when new, but as far as the present inventor is aware, no satisfactory means has been developed in the past to yield a true indication of the physical aging of such apparatus. True enough, it is customary to estimate the age of apparatus in terms of either the duration or the magnitude of their service output. For instance, the age of an automobile is stated in terms of either the number of years or the number of miles it has been driven, that of a transformer in terms of either the number of years of service or its kilowatt-hours output. In either instance, however, the measure of age used is recognized to be only a first or rough approximation, as the character of the use (or abuse) of the apparatus is known to affect profoundly the significance of the miles or years or kilowatt-hours as to the actual physical condition of the apparatus. This is true to such an extent that one generally relies more on an inspection of a car or of its tires than on the mileage figures. As mileage meters on automobiles are intended primarily to measure distance traveled, and kilowatt-hour meters are primarily intended to measure the output for billing purposes, it becomes evident that such instruments are not primarily age meters, that their use as such is only a borrowed use, and that a direct measurement of the physical age of an apparatus necessarily requires an instrument capable of weighting the duration of the service of the apparatus according to the significant conditions under which such service has been obtained from the apparatus.

The true age of a transformer is recognized to be essentially the age of its insulation, more particularly, of its solid insulation, assuming that in oil-filled apparatus the oil is inspected at intervals and purified if necessary. It is also known that the organic fibrous insulations generally used in transformers age approximately twice as fast for each ten-degree centigrade increase in temperature in the working range of the temperature of such apparatus. Any estimate of the true or significant age of a transformer must therefore take into account and make proper allowance for the temperature at which the transformer has been operated.

An object of the present invention is therefore to equip such apparatus with means primarily adapted to indicate their age in terms of their service weighted appropriately for at least the principal factor or factors which normally exist and modify the aging effect of such service. The invention will be described as applied to an oil-immersed apparatus like a transformer, but it is not limited thereto; and in the light of the explanations given below, its application to other apparatuses also will be evident to those skilled in the respective arts.

Fig. 1 shows diagrammatically an embodiment of the invention as applied to a transformer in which a counter indicates the age of the protected apparatus in terms of equivalent years of normal service, with proper allowance for the operating temperature of the apparatus. The counter is driven by a constant-speed motor through a variable-ratio speed-reduction mechanism, the speed ratio being controlled by thermostatic means in accordance with a predetermined function of the temperature of the apparatus of which the age is to be indicated by the counter.

Fig. 2 is a magnified view of one element of Fig. 1.

Fig. 3 is a modified embodiment of the invention with cam-type means to follow accurately a predetermined weighting curve for temperature. Such a curve is shown in Fig. 4.

Fig. 5 shows another embodiment of the invention in which the desired age indication is obtained by a meter integrating an auxiliary temperature-responsive electrical burden which varies as a predetermined function of the temperature of the apparatus of which the age is to be indicated.

Fig. 6 shows a modified detail of Fig. 5.

Similar parts are similarly marked in all of the figures.

Referring to Fig. 1, I have illustrated a transformer having a conventional winding 7 within a tank 8 which is filled with any suitable dielectric fluid such as oil. A bushing 9 is mounted on the tank cover. An age indicating arrangement for the transformer includes a suitable motor 10, such as a synchronous motor or induction motor of small slippage or good speed regulation. Conductors 11 are the motor terminals to be connected to a suitable source of voltage, for instance, to one set of the terminals of the transformer. When this motor is excited from an independent source, it is necessary to make certain that the source of supply will not fail when the apparatus is under load. Theoretically, this motor should run whether the protected apparatus is excited or unexcited, but it would not do much harm if the motor is stopped when the apparatus is unexcited. Block 12 represents any suitable speed-reduction or speed-change mechanism interposed between the driving motor 10 and a driven disc 13. Disc 13 in its turn causes disc 14 to rotate, the two discs being frictionally coupled through a coupling ball 15. A magnified view of this coupler 15 is shown in Fig. 2 as a ball-type permanent magnet, for instance, of Alnico alloy, with north and south poles on opposite sides of its belt of contact with the two discs. A groove is shown in the belt of contact of the magnetic material of the ball to prevent the short-circuiting of the magnetic poles. This groove, however, may be filled with a non-magnetic material, preferably elastic, to improve contact friction, if desired. When this coupling is made magnetic, the plates 13 and 14 are made of an iron alloy, so that the ball magnet may always hold them in good frictional contact with itself regardless of surface wear. The assembly of 13, 14, and 15 constitutes a combination clutch mechanism and variable speed-reduction mechanism. The latter feature is secured as follows:

The rotational axes of 13 and 14 are parallel but offset, so that the position of coupling 15, nearer one axis or the other, determines the ratio between the rotational speeds of 13 and 14. Disc 14 drives, through another speed-change mechanism 18, a counter 19. The speed-change ratios or mechanisms 12 and 18 are so chosen that for the synchronous or predetermined speed of motor 10, and proper position of 15, the counter 19 shows the physical age of the apparatus in terms of equivalent years of service. The position of coupling 15 is controlled by a bimetallic thermostat 16 located in the top-oil of the transformer and additionally heated electrically, as for instance, by making the transformer current or a portion thereof to flow therethrough, by connecting the leads 17, 17 of the bimetal element in series with the low-voltage circuit of the transformer, through an appropriate current transformer if necessary so as to enable the temperature of 16 to follow the hot-spot temperature of the transformer as is well known in the temperature indicating devices used for transformers. As the method or methods of connecting a hot-spot temperature indicating device of this type into the transformer circuit is well known in the art, details thereof are not shown in the figure.

The coiled bimetallic element 16 closes as it warms up, moving coupler 15 closer to the shaft of disc 14 and thereby raises the ratio of the rotational speed of 14 to that of 13, and the counter registers faster. The speed ratios of 12 and 18, the adjustment of 16, and the length of arm 21 are such that, when the transformer hot-spot is at the rated temperature corresponding to the continuous full load of the apparatus at an ambient temperature considered standard, the counter 19 indicates the actual years of operation of the transformer. If the actual temperature of the transformer has been hotter than the rated temperature for any reason, such as overloads or warmer-than-expected ambients, the counter 19 will register the service years faster than the actual (civil) years and at a rate corresponding to the equivalent years of aging of the solid insulation of the transformer at its rated temperature. The variation in the rate of registration of counter 19 with proper allowance for the temperature of the apparatus is accomplished by proper design of the rate of coiling or uncoiling of the bimetal 16 with variations in its temperature, which may also be determined by trial. A more direct and precise way of making such an adjustment will be described in connection with the modification shown in Fig. 3.

It is highly desirable to know at what rate the apparatus is aging at a given moment, in addition to knowing to what extent it has aged up to date or some other moment. This additional indication is obtained by tachometer 22 driven by element 14 through speed-change mechanism 20. Tachometer 22 may be an automobile "speedometer" or any other rotational speed-measuring device. The ratio of the speed-change mechanism 20 is so chosen as to make the indications of instrument 22 to show "1" when the temperature of the apparatus has the value considered as its rate or normal or reference temperature. Accordingly, when this instrument shows "10," it means that the apparatus is aging 10 times as fast as normal, etc. This is a more significant indication to the operator than a mere temperature indication would be.

Instrument 22 is shown with two indices, 23 and 24, the first one being the usual index of a tachometer, the second a resettable maximum indicator pushed up by 23 as the latter is advancing but not pulled back by it. As such resettable maximum indicating indices are well known in the art in a great variety of instruments, its structural details do not form a part of the present invention and are omitted.

Instrument 22 has scale divisions directly proportional to the rate of rotation of 14, without any particular reference to the temperature of the apparatus, because the rate of rotation of 14 already has in it full allowance for the apparatus temperature.

In Fig. 3 a different thermal responsive means is shown, including a heating element 31 with terminals 17, 17 (these terminals to be connected into the circuit as specified above for the terminals 17, 17 in Fig. 2), a heated thermometric bulb 32, containing a suitable fluid having marked expansion-contraction characteristics, with capillary tube 33 communicating with metallic bellows 34. The construction of such thermal elements is well known in the art and forms no part of the present invention, for which reason the details of the thermal element need not be described here further. Bellows 34 are movably attached to, and control the motion of, a lever 35 pivoted at 36.

Through a link 37, lever 35 is movably attached to a cam 38 pivoted at 39. The motion of cam 38 moves a member 41, which is a carriage for the ball 15, and thereby moves the ball 15 closer to, or away from, the axis of plate 14. To reduce contact friction between 38 and 41, a wheel 42 is shown on 41. Ball 15 is slidably mounted on shaft 43 of speed-changing means 12 and is driven by it. This result may be secured by making shaft 43 non-circular, and the hole through 15 to correspond thereto. Ball 15, magnetized as stated above, makes contact with iron plate 14 and drives it, and through it and through the speed change mechanism 18, drives counter 19. The element that is significantly novel in this embodiment of the invention, over the modification shown in Fig. 2, is cam 38. Its curve 40 is so shaped that the movement of 15 with the temperature changes at the bulb 32 will provide the correct temperature weighting factor at each temperature, as called for, for instance, by a given curve such as shown in Fig. 4.

The curve of Fig. 4 illustrates the relative rate of aging of organic fibrous solid insulations for various temperatures in terms of that at 70 degrees C., and was computed on the approximate rule of doubled rate of aging for every ten degrees centigrade increase in temperature. 70 degrees were used as the reference temperature in this curve because transformer efficiencies are guaranteed at that temperature; but any other temperature may also be used as the reference temperature if desired. As this curve is approximate and illustrative only, any other desired curve may also be followed, shaping the curve 40 of cam 38 so as to make the relative rate of rotation of plate 14, and hence the relative rate of registration of counter 19, at various temperatures of 32 to correspond to the relative rate required by the assumed curve of the type of Fig. 4. With this done, if the apparatus is maintained at the reference temperature, the years shown on the counter will correspond to actual (civil) years and fractions thereof during which the transformer has been kept at that temperature. At higher temperatures, the counter will register as the equivalent physical age more years than the civil years; at lower temperatures, less.

In general, it will be found desirable to use two counters, one resettable and the other non-resettable, to be used somewhat similarly to the resettable trip-mileage meter and the non-resettable total-mileage meter of an automobile.

In the light of the foregoing explanations, it will be clear that tachometer 22, graduated so as to indicate the relative rate of rotation of 14 correctly, will indicate also correctly the relative rate of aging of the apparatus in accordance with the functional curve on which the shape of cam 38 has been based.

In the light of the foregoing explanations, it will be evident also that if the apparatus is equipped with a thermometer, a practice well known in the art, a relative rate of aging can be secured from it, though not by a linear change of the scale from, let us say, degrees centigrade to relative rate of aging, but by a non-linear change, as required by the assumed functional curve such as that of Fig. 4. Using the curve of Fig. 4, the change in marking will be as follows:

| Degrees C | Change the Mark to |
|---|---|
| 70 | 1 |
| 80 | 2 |
| 90 | 4 |
| 100 | 8 |
| 110 | 16 |
| 120 | 32 |

In the embodiment of the invention shown in Fig. 5, 51 is an instrument of the kilowatt-hour type, and the invention will first be described to show how a standard kilowatt-hour meter can be applied for the purposes of the present invention. Conductors 52, 52 are the potential terminals of the meter and are connected to a dependable source of constant voltage, lines 54, 54, which may be fed either from the apparatus to be protected or from an independent source. Conductors 53, 53 are the current terminals of the meter, but these, instead of being connected in series with a circuit of the apparatus so as to conduct the load current of the apparatus, are arranged in series with an independent circuit element 56 and a dependable source of constant voltage, for instance, lines 54, 54 through an appropriate small transformer 55. Element 56 is a resistor having an inverse resistance-temperature characteristic, that is, diminishing resistance with increasing current. Heating coil 31 is used to maintain element 56 at the same temperature as the hot-spot temperature of the apparatus as described above in connection with the thermometric bulb 32 in Fig. 3 or the bimetal element 16 in Fig. 1. At constant voltage on lines 54, 54, and constant temperature at element 56, the registration of the meter will be directly proportional to the duration of registration and therefore the scale markings of the meter can be graduated in years and fractions thereof instead of kilowatt-hours. Then, the resistance of 56, at the desired reference temperature and the output voltage of 55, is so chosen that, when 56 has the desired reference temperature, the meter reading will represent actual (civil) years and fractions thereof; and the material for 56 is so chosen that its relative conductance at various temperatures, in the desired range of temperatures, corresponds to the relative rate of aging of the apparatus, as described above with reference to Fig. 4. Many materials are known with inverse resistance-temperature characteristic. Many electrolytes are of this type, and a variety of solids of this type are also known, as, for instance, carbon and various carbides, oxides. The choice of material would depend on the functional curve to be satisfied.

When the functional curve covers a wide range of relative rate of aging for a limited range of temperature, as the curve of Fig. 4, it may be difficult to find resistance materials with reasonable conductances that vary as widely with temperature. In those cases, it is more convenient to use an inductor of which the inductance varies with temperature. This is shown in Fig. 6 as an inductance coil 57 with a magnetic core 58 consisting of one of those well known magnetic alloys which change from a highly magnetic material to a practically non-magnetic material in a relatively small range of temperature at relatively low temperatures. Given the desired temperature range, such as the expected operating range of the apparatus to be protected, the composition and heat treatment of these alloys can be adjusted to yield an inductor 57—58 having an inductance variable with temperature approximating the specified functional curve. For instance, the alloy consisting of 68% iron and 32% nickel, and known in the trade as Curie alloy No. 4, has a permeability of about 2800 at 23 degrees C., dropping to 1400 between 105 and 110 degrees C., and dropping to about 1 at 170 degrees C. Iron alloys containing nickel and copper exhibit lower transformation points and may be useful where the expected maximum operating temperatures are lower. It is not to be expected, however, that such a variable inductance device can meet a specified functional curve as accurately as the cam device of Fig. 3 can, but it constitutes a relatively simple electrical means and will be found acceptable where the tolerances are more generous.

If a variable inductance element is used instead of a variable resistance element, then for meter 51 a reactive kilovolt-ampere-hour type of meter is to be used instead of the kilowatt-hour type, because the current flowing in the inductance coil 57 will be substantially in quadrature with that flowing in the resistor 56.

In the operation of an apparatus equipped for age indication as described above, with advancing age the overload protective relays may be set for smaller overloads, time delay relays set for shorter time delays, provision made to reduce the magnitude or duration of short-circuit currents, and otherwise measures may be taken to reduce the duty on the apparatus. Suitable inspection of the apparatus at regular intervals of age is another item in such operation. Even if this inspection should involve nothing more than the laboratory test of the insulating oil of the apparatus, a well-justified and valuable precaution will have been taken.

The invention having been explained clearly with the help of several embodiments thereof, various modifications will occur to those skilled in the art, and I, therefore, aim to include in the appended claims all such modifications as fall within the spirit of the invention.

What I claim as new and desire to secure by Letters Patent of the United States is:

1. Electrical apparatus having an electric circuit insulated with insulation, said apparatus being subject to aging with time and at a rate which increases with the temperature of its insulation, an integrating type of register, a constant speed motor means, a driving connection between said register and motor for driving said register at all times while said electrical apparatus is in service, said driving connection including means for varying the rate at which said motor means drives said register, and means responsive to the temperature of the insulation of said electrical apparatus for controlling said rate varying means thereby to cause the rate of operation of said register to be substantially proportional to the rate of aging of said apparatus.

2. Electrical apparatus having an electric circuit insulated with solid insulation and immersed in cooling insulating liquid, the useful life of said apparatus depending upon the age of the solid insulation and the aging effect of the temperature to which it is subjected, a register, a constant speed motor, a driving connection between said register and motor for continuously driving said register while the apparatus is in service regardless of the temperature of said solid insulation, said driving connection including a variable drive mechanism, temperature responsive means so located in the liquid as to respond generally to the hottest portion of the solid insulation, and means controlled by said temperature responsive means for controlling said variable speed drive mechanism so that the rate at which said motor drives said register is approximately representative of the resulting rate of aging of such solid insulation.

3. In an electrical system, an element subject to aging with time at a rate which varies with the temperature to which said element is subjected, a constant speed motor means, means responsive to the temperature of said element, an indicator controlled jointly by said motor means and temperature responsive means for indicating the rate of aging of said element, and a totalizing register driven by said motor means at a rate controlled by said temperature responsive means for indicating the physical age of said element.

4. Age indicating means for an electrical element, said element aging with time at a rate which increases with an increase in the temperature to which the element is subjected, comprising a constant speed motor, a register, a variable speed drive through which said register is driven by said motor, cam means for altering the speed ratio of said drive, and thermal response means subject to the temperature of the electrical element for moving said cam means, said cam means being shaped and controlled to cause the register to be driven at a rate proportional to the aging rate of said electrical element.

ARAM BOYAJIAN.

REFERENCES CITED

The following references are of record in the file of this patent:

UNITED STATES PATENTS

| Number | Name | Date |
|---|---|---|
| 842,981 | Tagliabue | Feb. 5, 1907 |
| 1,043,115 | Ledoux | Nov. 5, 1912 |
| 1,485,013 | Blakeslee | Feb. 26, 1924 |
| 1,618,800 | Blume | Feb. 22, 1927 |
| 2,222,551 | Ziebolz et al. | Nov. 19, 1940 |
| 2,320,310 | Stoddard et al. | May 25, 1943 |
| 2,320,311 | Myers | May 25, 1943 |

FOREIGN PATENTS

| Number | Country | Date |
|---|---|---|
| 1,541 | Great Britain | Jan. 22, 1903 |
| 268,517 | Germany | Dec. 22, 1913 |
| 329,610 | Germany | Nov. 30, 1920 |
| 355,775 | Germany | July 7, 1922 |
| 361,586 | Great Britain | Nov. 26, 1931 |